United States Patent
Song et al.

(10) Patent No.: US 7,437,270 B2
(45) Date of Patent: Oct. 14, 2008

(54) PERFORMANCE STATE MANAGEMENT

(75) Inventors: Justin Song, Tumwater, WA (US); Devadatta Bodas, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 225 days.

(21) Appl. No.: 11/393,393

(22) Filed: Mar. 30, 2006

(65) Prior Publication Data

US 2007/0239398 A1   Oct. 11, 2007

(51) Int. Cl.
*G06F 11/30*   (2006.01)

(52) U.S. Cl. ........................................ 702/182; 702/132

(58) Field of Classification Search ................. 702/117, 702/118, 132, 182, 186
See application file for complete search history.

(56) References Cited

U.S. PATENT DOCUMENTS

| | | | |
|---|---|---|---|
| 5,752,011 A | 5/1998 | Thomas | |
| 5,974,557 A | 10/1999 | Thomas et al. | |
| 6,216,235 B1 | 4/2001 | Thomas et al. | |
| 6,487,668 B2 | 11/2002 | Thomas et al. | |
| 6,996,728 B2 * | 2/2006 | Singh | ........................ 713/300 |
| 7,076,672 B2 | 7/2006 | Naveh et al. | |
| 2005/0138438 A1 | 6/2005 | Bodas | |
| 2005/0144486 A1 | 6/2005 | Komarla et al. | |
| 2005/0273635 A1 | 12/2005 | Wilcox et al. | |
| 2006/0026447 A1 | 2/2006 | Naveh et al. | |
| 2006/0053326 A1 | 3/2006 | Anati et al. | |

OTHER PUBLICATIONS

George, V., et al., "Method and Apparatus for a Zero Voltage Processor Sleep State", U.S. Appl. No. 11/323,254, filed Dec. 30, 2005.
Jahagirdar, S., "Method and System for Optimizing Latency of Dynamic Memory Sizing", U.S. Appl. No. 11/323,259, filed Dec. 30, 2005.

* cited by examiner

*Primary Examiner*—Bryan Bui
*Assistant Examiner*—Stephen J Cherry
(74) *Attorney, Agent, or Firm*—Schwegman, Lundberg & Woessner, P.A.

(57) ABSTRACT

Some embodiments of the invention may operate to measure a first output performance metric value associated with a current operation frequency of a processor, to set a trial operation frequency of the processor, and to measure a second output performance metric value associated with the trial operation frequency. If the measured performance variation is less than a specified acceptable performance variation, the trial operation frequency may be selected as a subsequent determined operation frequency.

19 Claims, 3 Drawing Sheets

PERFORMANCE STATE MANAGEMENT

TECHNICAL FIELD

The various embodiments described herein relate to managing processor performance generally, including apparatus, systems, and methods used to manage processor power usage.

BACKGROUND INFORMATION

Current methods of managing processor performance states (sometimes known as P states) are usually based on processor utilization. Since high utilization often means using a high operational frequency and concomitant high power, this approach often results in losing opportunities to save energy. For example, when a memory-dependent task is performed, with generally high utilization, the processor can stall at some point waiting for data. Running the processor at a high frequency during the stall period can result in needless energy use.

DETAILED DESCRIPTION

Figure 1:
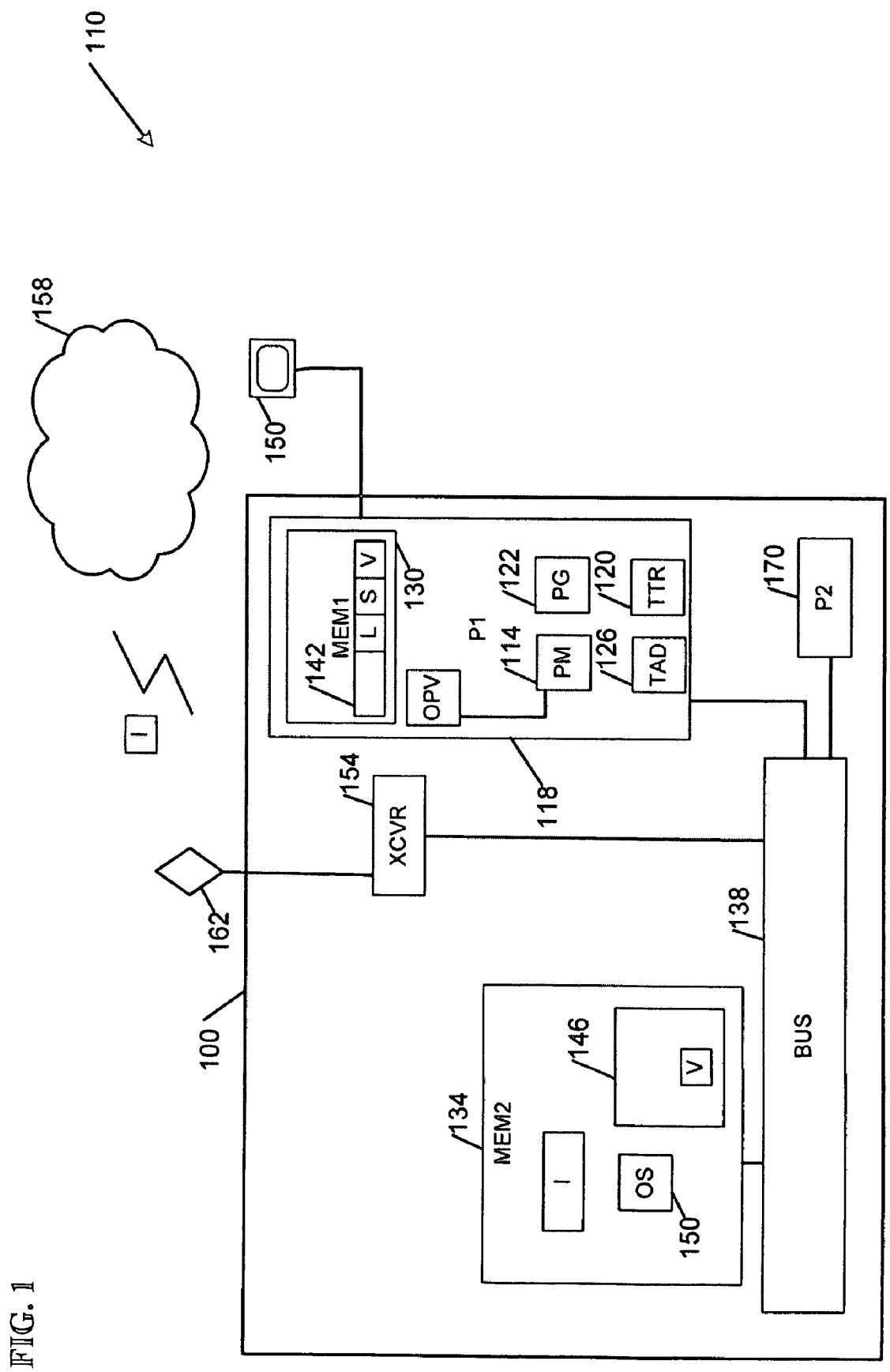
FIG. 1 is a block diagram of apparatus and systems for performance state management according to various embodiments of the invention.

FIG. 1 is a block diagram of apparatus 100 and systems 110 for performance state management according to various embodiments of the invention. In some embodiments, the performance state management apparatus 100 may include output measurement logic 114 to measure an output performance metric value OPV associated with a processor 118 (and perhaps a P state linked to the current processor operation frequency). The apparatus 100 may also include performance governor logic 122 to set a determined, or new operation frequency of the processor 118 responsive to the output performance metric value OPV.

Thus, the apparatus 100 may operate in conjunction with a defined performance metric based upon processor/computer system output, such that P states can be managed based on the value of the metric. The end result is that energy can be saved because the lowest possible operating frequency (that has little or no perceivable impact on performance) may be used to operate the processor/computer.

The output performance metric may be selected in several ways. For example, computer system performance may be measured in terms of the output generated. That is, higher output is usually equated with improved performance. It is also noted that the objective of power management is normally to increase output while reducing power consumption. Therefore, the output performance metric may be selected to include any number of factors, such as a measurement of network bandwidth, storage I/O throughput, and/or instructions retired from one or more processors. When network usage is contemplated, egress network bandwidth may be a useful measure of the number of user requests are processed by a server. Additional, or alternative measurements that can provide valid output performance metric values OPVs include the number of instructions fetched per unit time, the number of cache lines evicted, the number of micro-instructions retired, the number of non-bogus instructions retired, the cache hit ratio, the cache miss ratio, the DTLB (data translation lookaside buffer) hit ratio, the ITLB (instruction translation lookaside buffer) hit ratio, the trace cache delivering mode, the latency of memory access transactions, the latency of inter-processor data access transactions, the latency of I/O transactions, the latency of instruction execution, the processor interconnect bandwidth (including frontside bus, and other connection mechanisms), the processor interconnect queue depth, the chipset I/O data path bandwidth, chipset the unit data buffer depth, the amount of cache line false sharing, the number of OS context switches, the branch misprediction ratio, etc.

In some embodiments, P state management may be implemented in an operating system (OS) as a demand-based switching (DBS) power management policy governance system. In this case, the performance governor logic 122 may operate to periodically search for a new operating frequency in a adaptive way. For example, an adaptation time period may be defined (e.g., over a range of several seconds, down to 100 microseconds, depending on the particular implementation), perhaps with a relatively short duration, so that processor stall phases can be captured.

Each adaptation period may include several consecutive invocations of the performance governor logic 122 to test the use of a different operating frequency while measuring performance, followed by steady running at the test frequency, if an improvement is detected. When the next adaptation period begins, the search for a new operating frequency (with an improved performance) can begin again. Thus, in some embodiments, the apparatus 100 may include a timer 120 to measure a test-run period (e.g., tenths of a second, down to less than a microsecond, depending on the implementation) associated with selecting a trial operation frequency of the processor 118 that is different from a current operation frequency of the processor.

In some embodiments, at the beginning of the adaptation period, the performance governor logic 122 may operate to change the processor 118 operating frequency. The performance measurement logic 114 can detect whether there is a significant variation in the output performance metric value OPV. For example, if the performance for a tested frequency increase doesn't exceed some selected acceptable performance variation (e.g. about 3% or 5% for transaction processing workloads), this may be because the workload is light, and a low operating frequency is sufficient. It may also be that the workload is heavy, but performance doesn't scale linearly with frequency. In either case, the lower frequency should be selected, since no significant performance increase results with the tested increase in frequency.

On the other hand, if the measured performance gain due to using a higher operating frequency exceeds the acceptable performance variation, the higher frequency should be chosen to avoid a performance penalty. After several invocations of the performance governor logic operation, this adaptive approach results in convergence to an "optimum" frequency: relatively low in power consumption, with no performance loss below that which is deemed acceptable (i.e., the acceptable performance variation). In some embodiments, the processor 118 may operate at the selected frequency until the next adaptation period begins.

Thus, the apparatus 100 may include one or more processors 118, as well as a timer 126 to measure the adaptation period associated with setting the determined, or new, operation frequency. The apparatus 100 may also include one or more memories 130, 134 to store an acceptable performance variation V associated with the output performance metric value OPV. For example, the memories 130, 134 may include a non-volatile (e.g., flash memory or disk drive) or volatile memory (e.g., random access memory (RAM)) coupled to the processor 118.

The memories 130, 134 may be included within the processor 118 (e.g., memory 118), or comprise an external device coupled to the processor, either directly, or indirectly (e.g., via the bus 138. Thus, the acceptable performance variation value V may be stored in any location convenient to the designer of the apparatus 100, such as a register 142, or in a cache 146. The acceptable performance variation value V may also be stored with various amounts of accessibility, including as a value V forming part of the processor microcode, as an OS variable, or as a value V in program memory that may be adjusted using various application programs.

In some embodiments, the apparatus 100 may include a status bit S to indicate a current performance state associated with the determined, or newly-set operation frequency. One of more of the changes in performance can be stored in a log. Thus, in some embodiments, the apparatus 100 may include a memory 130 to store a log L of previous performance states including the current performance state S. Any one or more of the bits or registers described herein may comprise "sticky" bits, which are not reset until the processor is power-cycled, or the sticky bit is specifically reset by a software command.

Other embodiments may be realized. For example, a system 110, perhaps comprising a personal digital assistant (PDA), cellular telephone, or a laptop or desktop computer, may include one or more apparatus 100 as described above. The system 110 may also include one or more displays 150 to display information I associated with data processed by the processor 118.

The apparatus 100 and systems 110 of the various embodiments may be implemented in numerous ways. For example, in some embodiments, a system 110 may include a transceiver 154, such as a cellular transceiver or an infra-red transceiver, to transmit the information I, perhaps to a network 158, or to a mobile receiver (not shown). The transceiver 154 may be coupled to an antenna 162, including an omnidirectional, beam, patch, or dipole antenna, among others.

In some embodiments, the system 110 may include an OS 166 to receive a user selection (e.g., perhaps after being stored in one or the other of the memories 130, 134) of an acceptable performance variation V associated with the output performance metric value OPV. The system 110 may include an additional processor 170 dedicated to calculating the output performance metric value OPV.

Any of the components previously described can be implemented in a number of ways, including simulation via software. Thus, the apparatus 100; systems 110; output measurement logic 114; processors 118, 170; performance governor logic 122; timers 120, 126; memories 130, 134; bus 138; register 142; cache 146; display 150; transceiver 154; network 158; antenna 162; information I; log L; output performance metric value OPV; OS 166; status bit S; and acceptable performance variation V may all be characterized as "modules" herein.

Such modules may include hardware circuitry, single and/or multi-processor circuits, memory circuits, software program modules and objects, and/or firmware, and combinations thereof, as desired by the architect of the apparatus 100 and systems 110, and as appropriate for particular implementations of various embodiments. For example, such modules may be included in a system operation simulation package, such as a software electrical signal simulation package, a power usage and distribution simulation package, a power/heat dissipation simulation package, a signal transmission-reception simulation package, and/or a combination of software and hardware used to operate, or simulate the operation of various potential embodiments.

It should also be understood that the apparatus and systems of various embodiments can be used in applications other than processors coupled to a bus, and thus, various embodiments are not to be so limited. The illustrations of apparatus 100 and systems 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, single and/or multi-processor modules, single and/or multiple embedded processors, and application-specific modules, including multilayer, multi-chip modules. Such apparatus and systems may further be included as sub-components within a variety of electronic systems, such as televisions, cellular telephones, personal computers, switches, hubs, routers, modems, workstations, radios, video players, audio players, medical devices, vehicles, and others.

Figure 2:
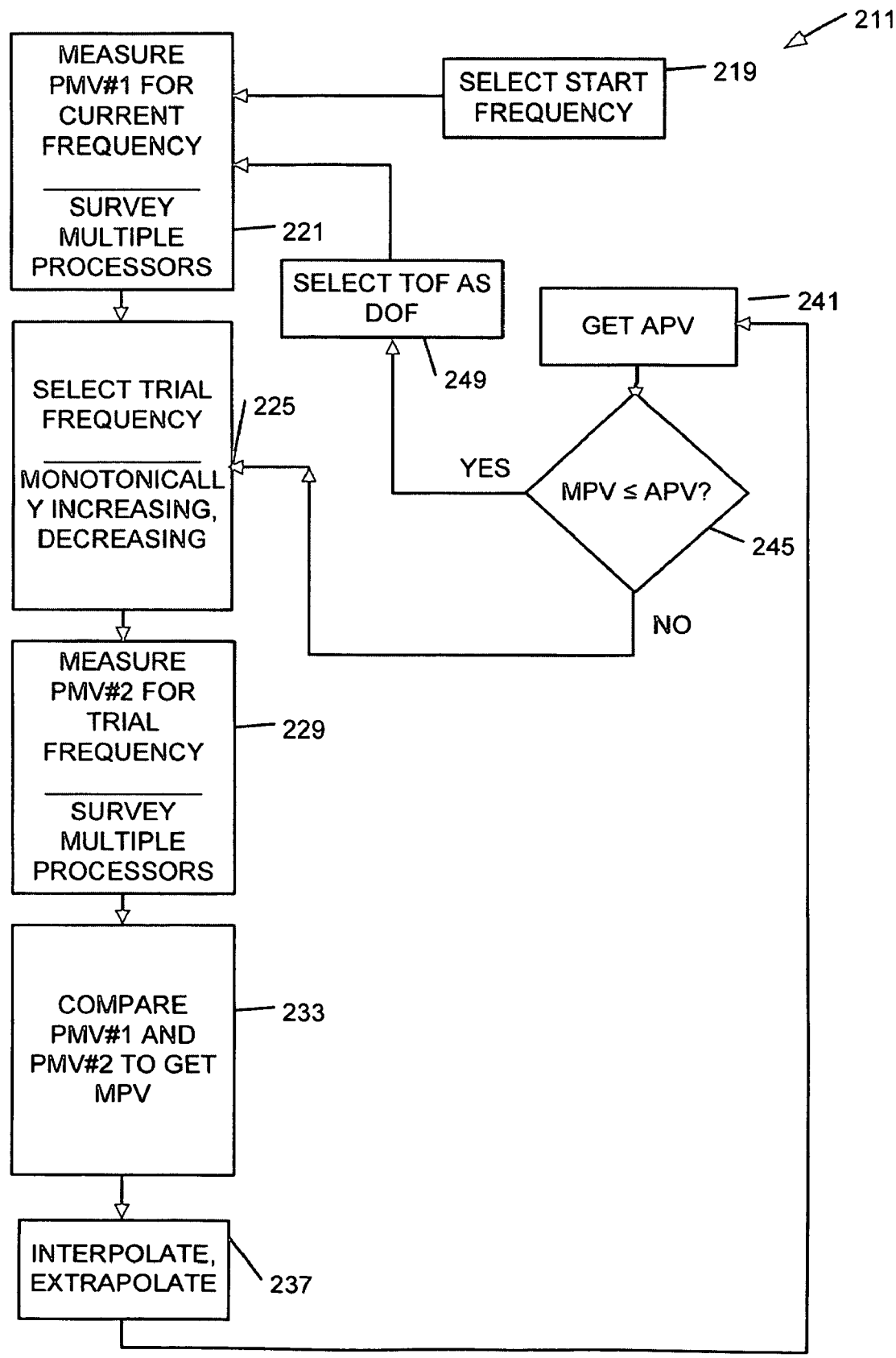
FIG. 2 is a flow diagram illustrating several methods for performance state management according to various embodiments of the invention.

Some embodiments may include a number of methods. For example, FIG. 2 is a flow diagram illustrating several methods 211 for performance state management according to various embodiments of the invention. For example, a performance state management method 211 may (optionally) begin at block 219 with setting an operating frequency to start processor operations. This frequency may be the lowest possible starting frequency, or the highest, or somewhere in between. The method may continue at block 221 with measuring a first output performance metric value associated with the processor and the current operation frequency of the processor (e.g., the starting frequency). The method may include, at block 221, surveying multiple processors, including the processor, to determine a plurality of associated output performance metric values.

In some embodiments, the method 211 may include selecting a trial operation frequency of the processor at block 225. Trial operation frequencies may be selected in numerous ways. For example, trial operation frequencies may be chosen by selecting a series of monotonically decreasing processor operation frequencies. Or perhaps a series of monotonically increasing processor operation frequencies. Thus, performance states including higher frequencies may be tested first, with states including lower frequencies tested afterward. Trials may also occur in the reverse direction, with operating frequencies being tested in order from lower values to higher values. Other possibilities include testing both a lower and a higher frequency, or stepping up and down in frequency by two or more possible values, in sequential or alternating fashion. A percentage change in operation frequency may also be selected, so that the next operating frequency trial occurs at a frequency that is at least some selected percentage above or below the current operating frequency value.

In some embodiments, the method 211 may include measuring a second output performance metric value associated with the trial operation frequency of the processor at block 229. Again, multiple processors may be surveyed to measure multiple second output performance metric values associated with corresponding multiple trial operation frequency values. The method 211 may include at block 233 comparing the first output performance metric value (e.g., current value) to the second output performance metric value (e.g., test value) to determine a measured performance variation.

In some cases, interpolation may be used to determine the performance gain/loss for an untried frequency. For example, assume that state P1 is associated with operation at 1 GHz, state P2 is associated with operation at 2 GHz, state P3 is associated with operation at 3 GHz, state P4 is associated with operation at 4 GHz, and state P5 is associated with operation at 5 GHz. If the output performance metric value associated with state P1 is known to be 2, and the output performance metric value associated with state P3 is known to be 6, then the output performance metric value associated with state P2 may be determined by interpolation as 4. Thus, the method 211 may include interpolating an estimated performance variation of the processor based on the measured performance variation at block 237.

Similarly, in some embodiments, extrapolation may be used. That is, the method 211 may include extrapolating an estimated performance variation of the processor based on the measured performance variation at block 237. Thus, using the example given above, if the output performance metric value associated with state P1 is known to be 2, and the output performance metric value associated with state P2 is known to be 4, then the output performance metric value associated with state P3 may be extrapolated as 6.

In some embodiments, the method 211 may include fetching a value that has been stored with respect to an acceptable performance variation at block 241. This may include reading a register to determine an acceptable performance variation associated with the first output performance metric and the second output performance metric, for example.

If the change between the first and second output performance metrics, as a measured performance variation (MPV), is determined to be less than or equal to the acceptable performance variation (APV) value at block 245, then the change likely has no perceivable impact, assuming a judicious choice of the APV value, and the method 211 may continue with setting the trial operation frequency as a determined operation frequency (DOF) of the processor at block 249. A new measurement sequence may then begin at block 221. However, if the MPV is greater than the APV, the trial operation frequency will not usually be adopted as the determined operating frequency, and a new trial frequency may be selected at block 225.

Choosing the lowest operating frequency where performance is "good enough" is usually a desirable result. Therefore, in some embodiments, the output measurement logic and/or the performance governor logic may operate to maintain records of performance gain or loss with respect to each pair of frequencies (e.g., the COF and TOF). For example, consider a processor having 3 P states: 2.8 GHz, 3.2 GHz, and 3.6 GHz. Each time adaptation begins, the improvement in performance when changing from 2.8 GHz-to-3.6 GHz might be extrapolated as 3.6/2.8=1.286, or about 29%. However, if it is determined that the actual performance gain achieved by making a transition from 2.8 GHz to 3.6 GHz is only 6%, then the extrapolation may be updated to 1.06, and a projection for moving from 2.8 GHz-to-3.2 GHz might be interpolated as 1.03 (here linear interpolation is used—other interpolation schemes, such as cosine interpolation, cubic interpolation, Hermite interpolation, Bezier interpolation, spline interpolation, and piecewise-Bezier interpolation can also be used, as known to those of skill in the art). Since an improvement of 1.03 might be considered "good enough" (where a 3% difference is within the specified APV value), a P state linked to operation at 3.2 GHz in lieu of 3.6 GHz can be selected.

It should be noted that the methods described herein do not have to be executed in the order described, or in any particular order. Moreover, various activities described with respect to the methods identified herein can be executed in repetitive, simultaneous, serial, or parallel fashion. Information, including parameters, commands, operands, and other data, can be sent and received in the form of one or more carrier waves.

Upon viewing the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment, including Hypertext Markup Language (HTML) and Extensible Markup Language (XML). Thus, other embodiments may be realized.

Figure 3:
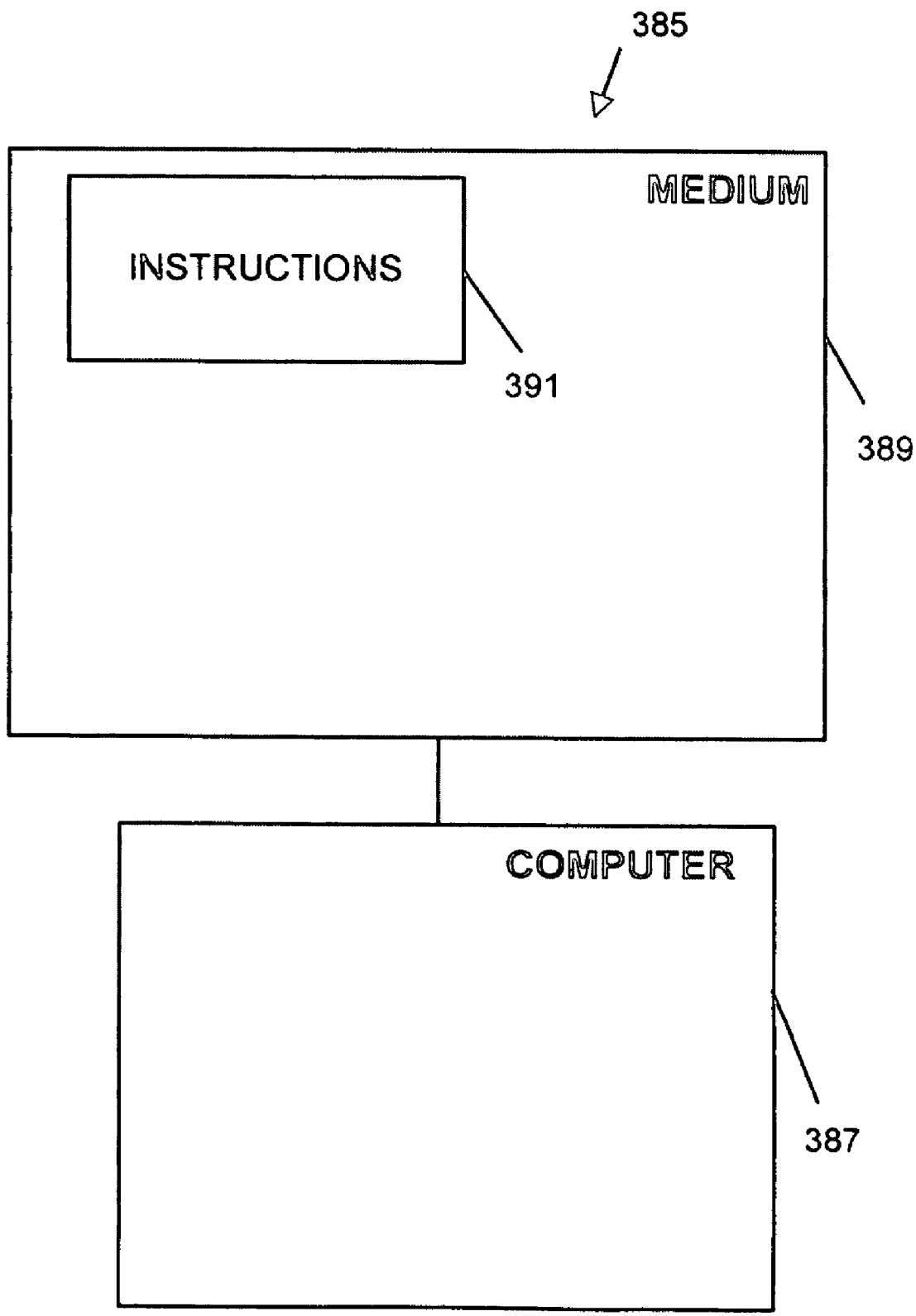
FIG. 3 is a block diagram of an article for performance state management according to various embodiments.

FIG. 3 is a block diagram of an article 385 for performance state management according to various embodiments, such as a computer, a memory system, a magnetic or optical disk, some other storage device, and/or any type of electronic device or system. The article 385 may include a computer 387 (having one or more processors) coupled to a computer-readable medium 389, such as a tangible medium (e.g., fixed and removable storage devices, and memory having electrical, optical, or electromagnetic conductors) or an intangible medium, such as a carrier wave, having associated information 391 (e.g., computer program instructions and/or data), which when executed by the computer 387, causes the computer 387 to perform a method including such actions as measuring a first output performance metric value associated with a processor and the current operation frequency of the processor, setting a trial operation frequency of the processor, and measuring a second output performance metric value associated with the trial operation frequency. Further activities may include interpolating an estimated performance variation of the processor based on the measured performance variation, or extrapolating an estimated performance variation of the processor based on the measured performance variation.

Implementing the apparatus, systems, and methods disclosed herein may improve the amount of processor power that can be saved when compared to conventional solutions. For example, laboratory testing indicates that power savings of 17%-24% may be achieved, even when the processor is heavily utilized. This is possible in some embodiments because the adaptive selection mechanism disclosed herein can operate to select the lowest useful operating frequency in many circumstances, including when memory and I/O operation bottlenecks are encountered.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   output measurement logic to measure an output performance metric value associated with a processor;
   performance governor logic to set a determined operation frequency of the processor responsive to the output performance metric value;
   a comparison module to measure an output performance variation between a first output performance metric value and a current output performance metric value; and
   an estimate module to extrapolate an estimated performance variation of the processor based on the measured performance variation.

2. The apparatus of claim 1, further including:
   a timer to measure an adaptation period associated with setting the determined operation frequency.

3. The apparatus of claim 1, further including:
   a memory to store an acceptable performance variation associated with the output performance metric value.

4. The apparatus of claim 1, further including:
   a timer to measure a test-run period associated with setting a trial operation frequency of the processor that is different from a current operation frequency of the processor.

5. The apparatus of claim 1, further including:
   a status bit to indicate a current performance state associated with the determined operation frequency.

6. The apparatus of claim 5, further including:
   a memory to store a log of previous performance states including the current performance state.

7. A system, including:
   output measurement logic to measure an output performance metric value associated with a first processor;
   performance governor logic to set a determined operation frequency of the first processor responsive to the output performance metric value;
   a comparison module to measure an output performance variation between a first output performance metric value and a current output performance metric value; and
   an estimate module to extrapolate an estimated performance variation of the processor based on the measured performance variation; and
   a display to display information associated with data processed by the first processor.

8. The system of claim 7, further including:
   a cellular transceiver to transmit the information.

9. The system of claim 7, further including:
   an operating system to receive a user selection of an acceptable performance variation associated with the output performance metric value.

10. The system of claim 7, further including:
    a second processor dedicated to calculating the output performance metric value.

11. A method, comprising:
    measuring a first output performance metric value associated with a processor and a current operation frequency of the processor;
    setting a trial operation frequency of the processor;
    measuring a second output performance metric value associated with the trial operation frequency of the processor;
    comparing the first output performance metric value to the second output performance metric value to determine a measured performance variation; and
    extrapolating an estimated performance variation of the processor based on the measured performance variation.

12. The method of claim 11, further including:
    reading a register to determine an acceptable performance variation associated with the first output performance metric and the second output performance metric.

13. The method of claim 11, further including:
    setting the trial operation frequency as a determined operation frequency of the processor if the measured performance variation is less than an acceptable performance variation.

14. The method of claim 11, further including:
    interpolating an estimated performance variation of the processor based on the measured performance variation.

15. The method of claim 14, further including:
    setting a series of monotonically decreasing processor operation frequencies, including the trial operation frequency of the processor.

16. The method of claim 14, further including:
    surveying multiple processors, including the processor, to determine a plurality of associated output performance metric values.

17. A computer-readable medium having instructions stored thereon which, when executed by a computer, cause the computer to perform a method comprising:
    measuring a first output performance metric value associated with a processor and a current operation frequency of the processor;
    setting a trial operation frequency of the processor;
    measuring a second output performance metric value associated with the trial operation frequency of the processor; and
    extrapolating an estimated performance variation of the processor based on a measured performance variation determined by a comparison between the first output performance metric value and the second output performance metric value.

18. A computer-readable medium having instructions stored thereon which, when executed by a computer, cause the computer to perform a method comprising:
    measuring a first output performance metric value associated with a processor and a current operation frequency of the processor;
    setting a trial operation frequency of the processor;
    measuring a second output performance metric value associated with the trial operation frequency of the processor; and interpolating an estimated performance variation of the processor based on a measured performance variation determined by a comparison between the first output performance metric value and the second output performance metric value.

19. A method, comprising:

measuring a first output performance metric value associated with a processor and a current operation frequency of the processor;

setting a trial operation frequency of the processor;

measuring a second output performance metric value associated with the trial operation frequency of the processor;

comparing the first output performance metric value to the second output performance metric value to determine a measured performance variation; and interpolating an estimated performance variation of the processor based on the measured performance variation.

* * * * *